Nov. 19, 1963　　　　A. J. SORIENTE　　　　3,111,486
FILTER WITH AUTOMATIC BACKWASH CONTROL
Filed Oct. 28, 1960　　　　　　　　　　　　　4 Sheets-Sheet 1
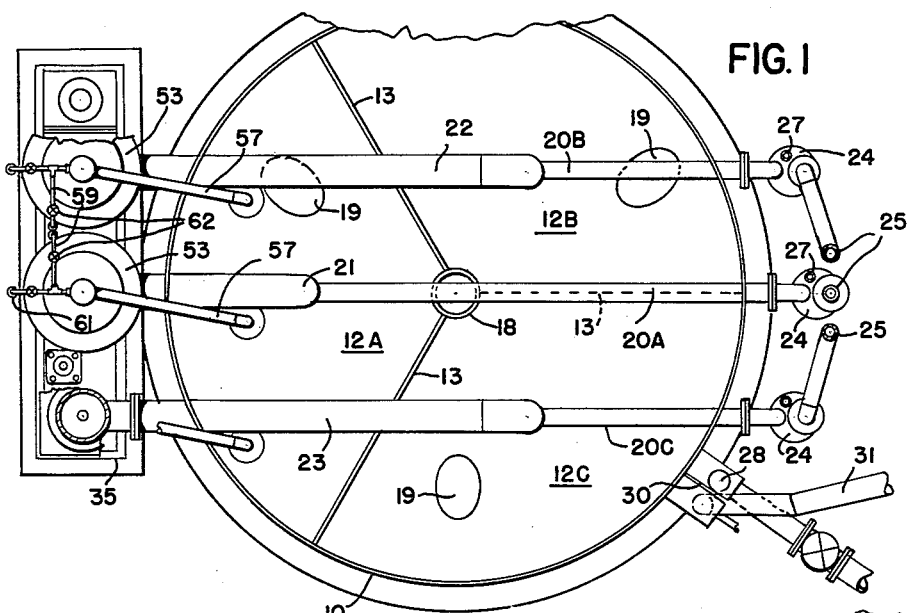
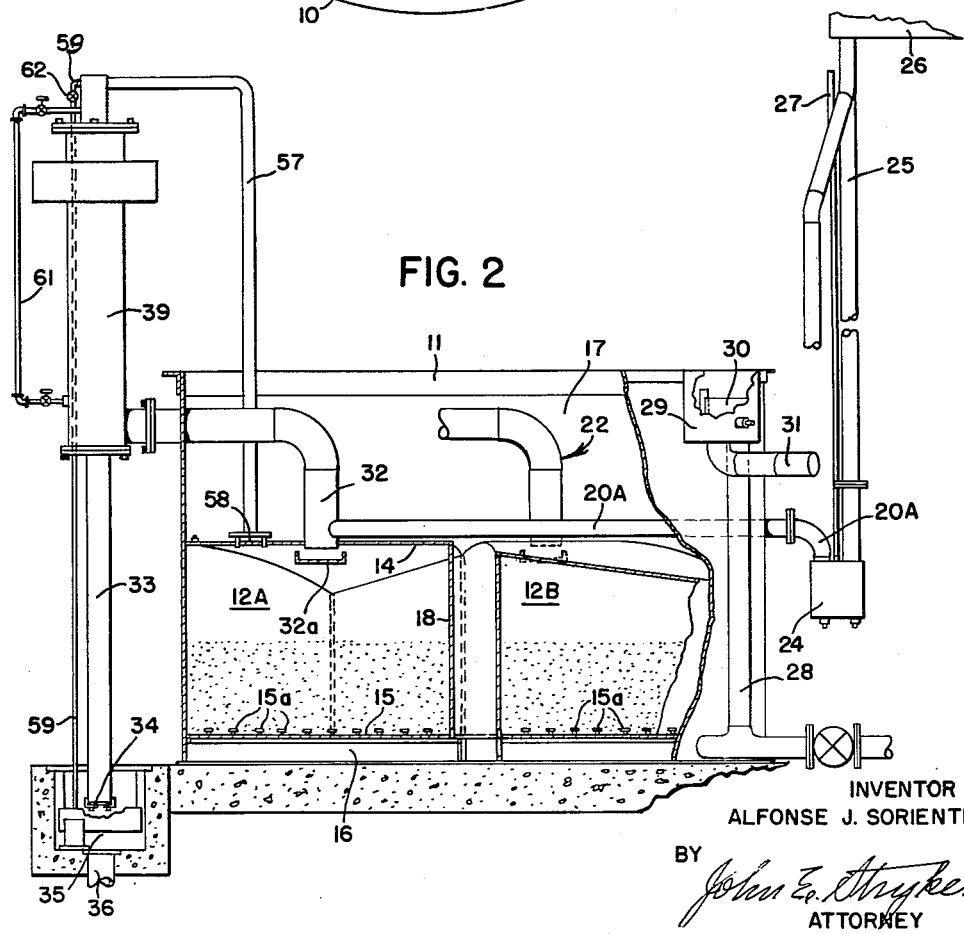
INVENTOR
ALFONSE J. SORIENTE
BY
John E. Stryker
ATTORNEY

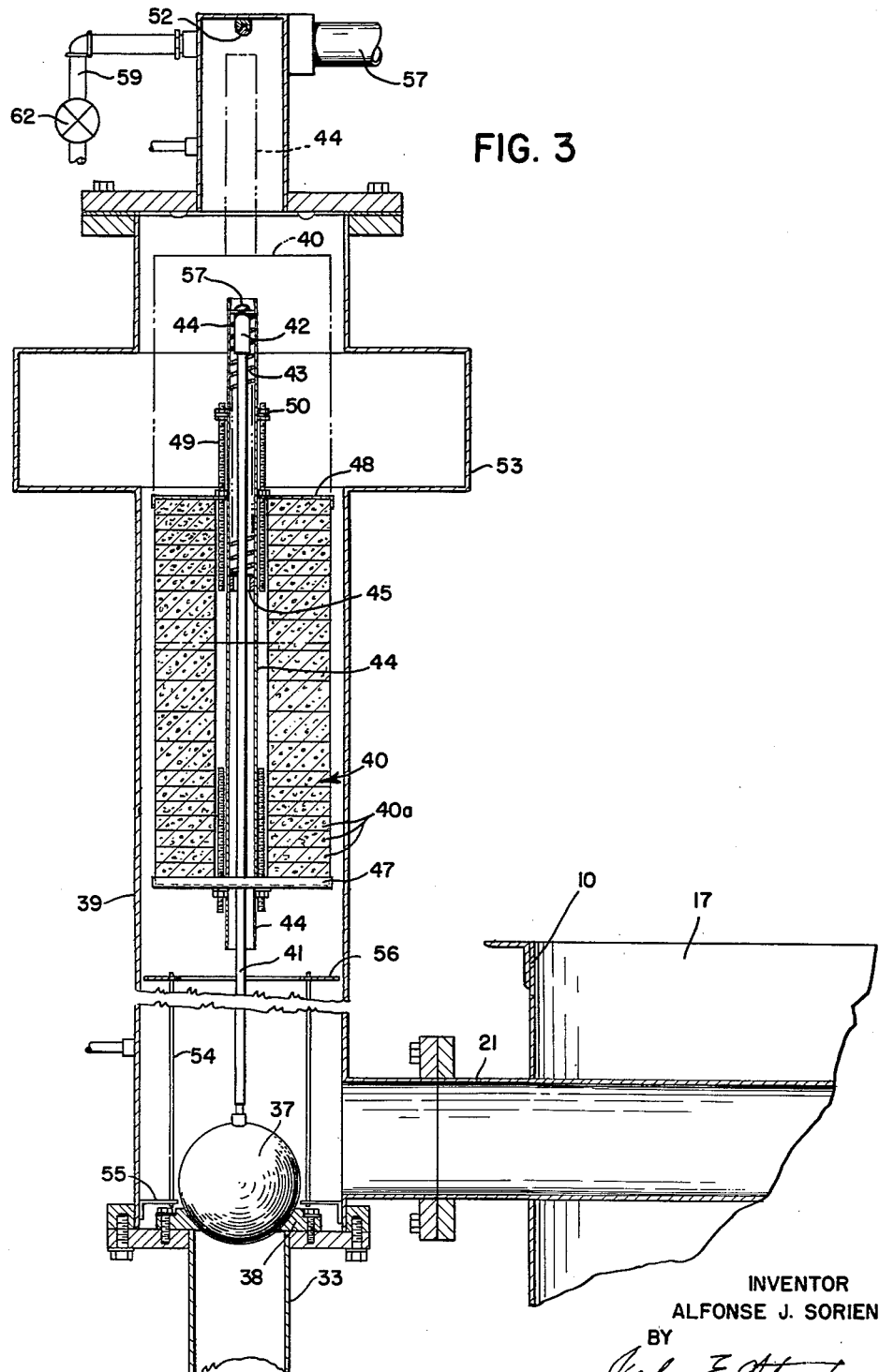

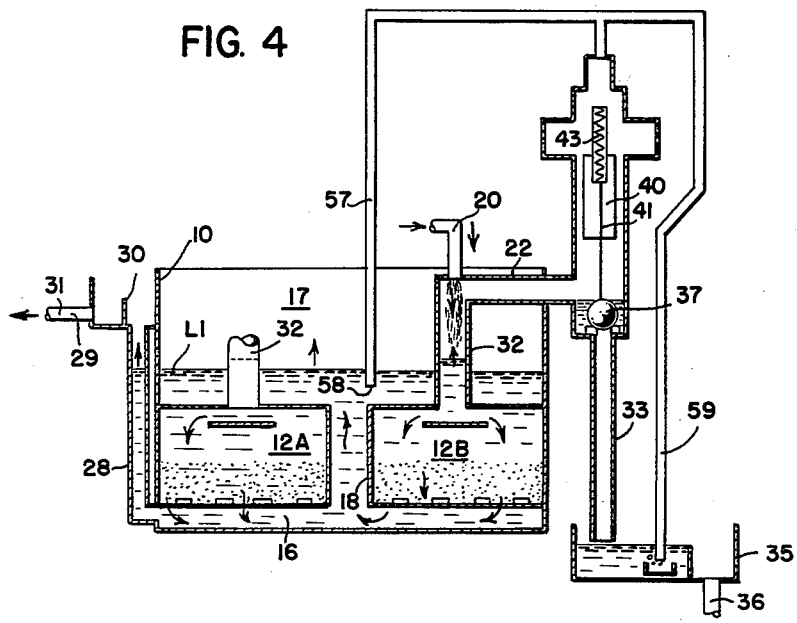
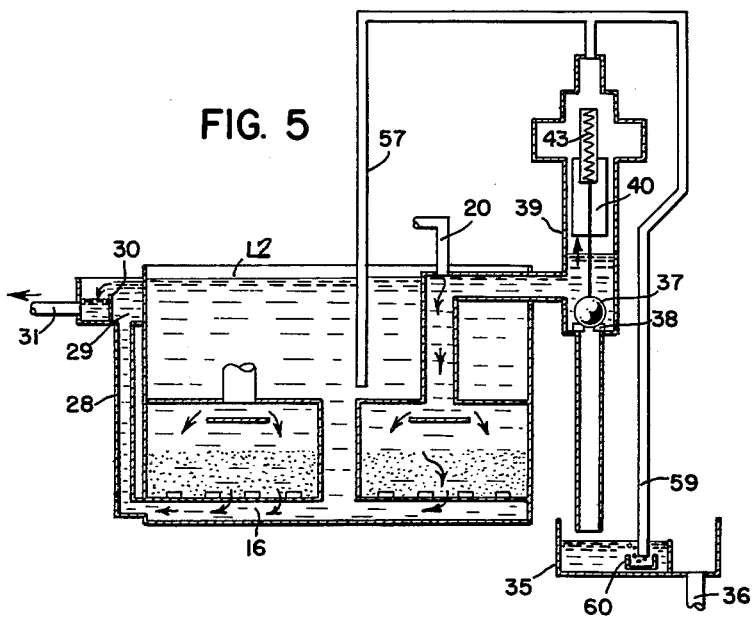

Nov. 19, 1963   A. J. SORIENTE   3,111,486
FILTER WITH AUTOMATIC BACKWASH CONTROL
Filed Oct. 28, 1960   4 Sheets-Sheet 4
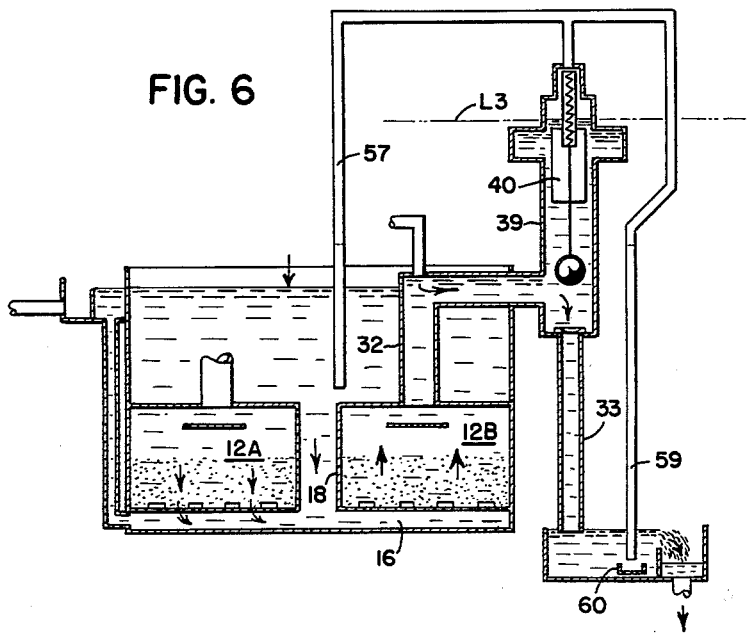
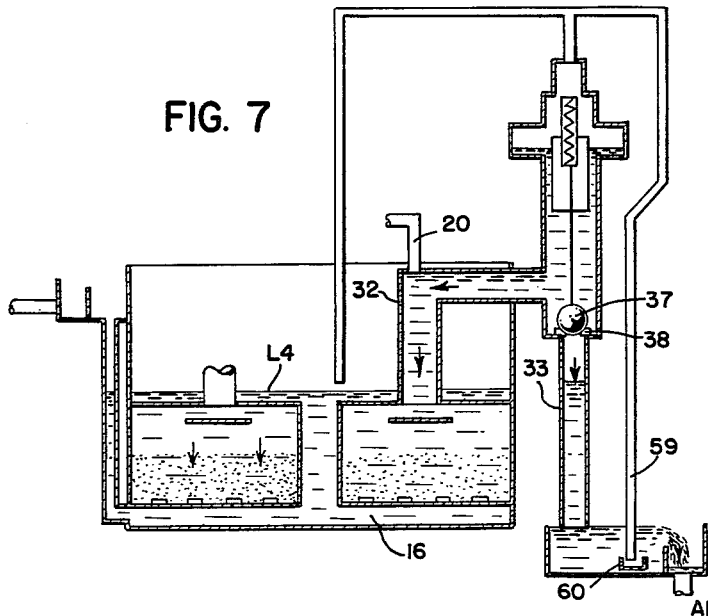
INVENTOR.
ALFONSE J. SORIENTE
BY
John E. Stryker
ATTORNEY 3,111,486
FILTER WITH AUTOMATIC BACKWASH
CONTROL
Alfonse J. Soriente, Gillette, N.J., assignor to Union
Tank Car Company, Chicago, Ill., a corporation of
New Jersey
Filed Oct. 28, 1960, Ser. No. 65,621
12 Claims. (Cl. 210—108)

This invention relates to gravity filters of the type having means for automatically initiating and terminating backwash cleansing of the filter medium, and particularly to filters having means for initiating backwash flow when a predetermined pressure loss develops across the filter bed as a result of the accumulation of solid particles deposited in the bed by the liquid being filtered.

It is an object of my invention to provide an automatic filter of improved reliability and efficiency resulting from the provision of a float actuated valve for initiating and terminating the backwashing operation.

A further object is to provide in a filter of the class described novel mechanical means for initiating high rate backwashing operation, including means for instantaneously creating fully operative sub-atmospheric pressure in a backwash conduit, without waste of water.

Another and particular object is to provide a multiple bed filter having a storage compartment for backwash water of greatly increased capacity, and individual controls for the initiation of backwash flow through the several filter beds whereby the backwash rate of flow through each filter bed may be maintained at a substantially constant, high level.

My invention also includes certain other features of construction which will be described and more fully pointed out in the following specification and claims.

In the accompanying drawings, a preferred embodiment of my invention is illustrated, by way of example, and not for the purpose of limitation.

Referring to the drawings:

FIGURE 1 is a plan view of a multiple bed filter unit embodying the present invention, with a portion of the tank broken away and certain other elements shown in horizontal section;

FIG. 2 is a part side elevational view and part vertical sectional view showing the unit illustrated in FIG. 1;

FIG. 3 is a detail, vertical sectional view showing one of my float actuated control valves and float chamber assembly, and FIGS. 4, 5, 6 and 7 are schematic, vertical sectional views showing flow conditions in a multiple bed filter unit at various stages during the cycle of operation, including the filling of the reservoir, filtering operation, start of the backwash cycle, and finish of the backwash cycle respectively.

Referring to FIGS. 1 and 2, a plurality of separate filter chambers are shown in a large cylindrical tank 10 having an open top 11, the several chambers being indicated by the numerals 12A, 12B and 12C, respectively. These chambers are separated by radially extending partitions 13, and each has a top wall 14 and a false bottom wall 15 fitted with a multiplicity of slotted distributor heads 15a (FIG. 2) adapted to retain fine filter medium in the chamber while allowing the passage of water to and from the bottom of the filter bed. The several bottom walls 15 extend horizontally above a common underdrain compartment 16. Extending above the several filter chambers is a common backwash storage compartment 17 which is in continuous communication with the underdrain compartment 16 through a central, vertical conduit 18.

Access to the several filter chambers is provided through manholes having covers indicated at 19 in FIG. 1, these covers being normally closed and sealed. Liquid to be filtered is fed to the several filter chambers 12A, 12B and 12C through inlet pipes 20A, 20B and 20C, respectively. Each inlet pipe has a discharge end connected to an open lower end portion of one of three backwash conduits indicated generally at 21, 22 and 23, respectively. Liquid is fed to the several inlet pipes by gravity feed means which limit the hydrostatic pressure and rate of feed to the filter. As shown in FIGS. 1 and 2, each of the inlet pipes is connected to an air eliminator 24 which is supplied through a riser pipe 25 extending to an elevated feed box 26. This feed box is supported at such an elevation as to provide a gravity feed of the water or other liquid to be filtered at a suitable hydrostatic pressure. An air vent pipe 27 extends upwardly from the air eliminator 24 to an elevation adjacent to the feed box 26.

Filtered liquid is discharged to service or storage from the underdrain compartment 16 through an outlet pipe 28 extending upwardly to a weir box 29 having a weir 30, the upper edge of which is located at an elevation corresponding to the desired operating level of liquid in the backwash compartment 17. The filtered liquid flows from the weir box 29 through a service pipe 31.

*Backwash Control*

The several filter beds in the chambers 12A, 12B and 12C are automatically backwashed under control of independently operating float actuated valves which severally control the flow through the backwash conduits 21, 22 and 23. Each of these conduits has an intake end portion 32 communicating with the upper portion of one of the filter chambers and a tail pipe 33 having its lower end disposed at an elevation below the bottom of the chamber 16. As indicated in FIG 2, an adjustable backwash rate control device 34 is mounted on the lower end of each tail pipe 33 and is arranged to discharge rinse water carrying the solids removed from the filter bed into a sump 35 and waste pipe 36.

As best shown in FIG. 3, flow of wash water through each backwash conduit is under control of a float actuated valve having a closure member 37 and a seat 38 surrounding the upper end of the tail pipe 33. A vertically elongated float chamber 39 extends upwardly from the seat 38 to an elevation substantially above the storage compartment 17 of the tank 10. Operatively connected to the valve closure member 37 is a float body indicated generally by the numeral 40. This float body is movable in the chamber 39 in response to changes in the level of liquid therein.

To insure quick and positive opening of the valve member 37 at the instant that a predetermined pressure loss develops across a filter bed, I provide a lost motion linkage operatively connecting the valve closure member 37 to the float body 40. This linkage includes a stem 41 connected at its lower end to the member 37 and having fixed on its upper end a head 42 constituting an upper end abutment for a coiled compression spring 43. This spring is confined in a coaxially disposed tube 44 extending through a central opening in the float body 40. The tube 44 is connected to the float body 40 to move therewith in a limited range in relation to the stem 41 and closure member 37. The lower end of the spring 43 abuts against the bushing 45 which is fixed in the tube 44 and fits loosely about the stem 41. By this lost motion linkage, I provide for the storage of energy in the spring 43 as the float body 40 rises in the chamber 39. The energy thus stored in the spring is approximately equivalent to the buoyancy of the float so that the closure member 37 is moved up quickly, out of the path of the high velocity flow into the tail pipe 33, when the level of liquid in the float chamber reaches a predetermined high level sufficient to raise the member 37 from its seat.

Float body 40 is preferably constructed from a synthetic foam material, e.g., "Styrofoam" of low specific gravity. The buoyancy of the float is made adjustable by providing a multiplicity of annular sections 40a of the foam material which are confined between a lower end cup 47 and an upper end cup 48. The number of sections 40a between the cups 47 and 48 may be varied to provide the buoyancy required in different installations. To this end, the tube 44 is adjustably connected to the cup 48 by elongated, threaded members 49 having lock nut connections with ears 50 projecting from and fixed on the exterior of the tube 44. The lower cup 47 may be made adjustable along the tube 44 in a similar manner. Both ends of the tube 44 are open and when the valve is open the head 42 on the stem 41 projects from the upper end of the tube and is provided with a positive stop consisting of a bumper 57 fixed on the head 42 and a coacting bumper 52 fixed on the upper end wall of the chamber 39. Increased capacity and volume of water for release in creating suction in the backwash conduit when the float valve is actuated to open position is provided by means of an enlargement 53 of the float chamber. Straight line movement of the closure member 37 to and from its seat is insured by providing a plurality of vertical guide rods 54. These rods are connected at their lower ends to an annular bracket 55 which is secured to the wall of the chamber 39 and are retained in spaced vertical positions by a ring 56 connecting their upper ends together.

Each of the float chambers 39 is provided with means for breaking the vacuum therein at the end of the backwash operation. Suitable means for accomplishing this may comprise a vent pipe 57 communicating at its upper end with the upper end of the float chamber 39 and having an open lower end 58 communicating with the storage compartment 17 adjacent to the top wall 14 of one of the filter chambers. Another vent pipe 59 connects the upper end of the float chamber 39 with a water seal pot 60 preferably located in the sump 35. A loss-of-head sight gauge 61 is also provided for each of the float chambers 39. Interposed in each of the vent pipes 59 is a manually operable valve 62 which is normally open and adapted to be closed when the filters are initially started.

The multiple filter bed unit described herein is readily adjustable so that the initiation of the backwash cycle for each filter bed will occur at a different time in relation to the backwash cycle for the other beds of the unit. The necessary adjustment may be made, for example, by closing the manual valve 62 in one of the vent pipes 59 so that the pressure in the associated float chamber 39 builds up to a point where the buoyancy of the float is not sufficient to lift the closure member 37 off its seat. Thus, by keeping one or more of the valves 62 closed for various periods of time when the filters are initially started, the start of the several backwashing cycles can be staggered a few hours apart so that backwashing of the several filter beds does not occur simultaneously. When one of the closure members 37 is raised to open position it does so in a fraction of a second and so changes the conditions in the other chambers that they cannot start their respective backwashing cycles during the backwashing of another filter bed. Specifically, at the start of backwash flow in one filter chamber the level of liquid in all of the float chambers 39 descends. This is caused by the descent of the level of liquid in the common reservoir 17 and gradual flow of some liquid out of the chambers 39 through their connected backwash conduits 21, 22 and 23. The differential pressure across the beds is not thereby changed but the static level of pressure has changed, thereby preventing the other float valves from opening until the reservoir 17 has been filled again. The possibility that two filter beds would be backwashed simultaneously is further minimized for the reason that the hydraulic conditions throughout the several filter chambers would have to be identical in order for the pressure loss to build up to exactly the same point in exactly the same time in the several float chambers.

*Operation*

The operation of my improved multiple bed filter and the controls therefor will be best understood by reference to FIGS. 4, 5, 6 and 7. FIG. 4 shows a condition during the filling of the backwash compartment, shortly after the filter has been started. Water entering through the inlet pipe 20 flows into the upper part of the filter chamber 12B through conduit 32, thence downwardly through the filter medium. The filtered water flows from the underdrain compartment 16 upwardly through the conduit 18 to gradually fill the storage chamber 17. The rising level of water is indicated at L–1. Levels in the backwash conduit 32 and filter water outlet 28 are also rising and air is being released through the vent pipe 59 and seal pot 60. In a typical installation this filling operation may require approximately fifteen minutes.

When the level of water in the reservoir 17 reaches the operating level L2 the filtering operation starts and water flows from the inlet pipes 20 through the filter beds to chamber 16 and thence through outlet conduit 28, weir box 29 and over the weir 30 to the service pipe 31. During this filtering operation the water level in the backwash storage compartment 17 remains constant at L2 throughout the filtering operation, and the level in float chamber 39 gradually rises and is indicative of the loss of head across the filter bed. Thus the difference between the fixed level L2 in the backwash storage compartment and that in the float chamber 39 represents the actual loss of head across the filter. Air continues to be released through the seal pot 60 and vent pipe 59 throughout the filtering cycle. The level differential continues to increase until it reaches a predetermined value, e.g., equivalent to a head of five feet, indicated by the level L3 in FIG. 6. The length of the filter cycle is dependent on the amount of turbidity in the water being filtered. Also during the filtering operation the float body 40 rises, compressing the spring 43, while the valve closure member 37 remains in closed position on its seat 38. Momentarily before the level in the float chamber 39 reaches its maximum elevation L3 the float body 40 carrying the tube 44 will have moved up to a position such as that indicated in broken lines in FIG. 3.

The backwash cycle is started by the opening of the valve member 37, as indicated in FIG. 6. As a result of the storing of the energy in the spring 43, the valve opens quickly to a wide open position, wherein the member 37 is clear of the high velocity flow into the tail pipe 33. The rapid flow down the tail pipe causes the level in the float chamber to fall, expanding the trapped air in the upper portion of the chamber, this air having been under slight superatmospheric pressure equivalent to the head of water in the seal pot 60. Such expansion of the air reduces its pressure to below atmospheric pressure, thereby establishing siphon action in the backwash conduit portions 32 and 33. The siphon created by the sudden surge of water into the tail pipe is maintained as long as the lower ends of the vent pipes 57 and 59 are water sealed. During the backwashing operation water is drawn up through the conduit 32 and filter bed 12B, and is replaced by water from the reservoir compartment 17 which flows downwardly through the conduit 18 into the compartment 16 and thence upwardly through the filter bed in the chamber 12B.

During backwashing in the filter chamber 12B water is filtered downwardly through the filter chambers 12A and 12C, being supplied through the inlet pipes 20a and 20c. When backwash flow has been established, the levels of water in the vent pipes 57 and 59 and float chamber 39 remain constant and the level in the backwash storage compartment 17 gradually drops throughout the backwashing period. The influent water to the filter compartment which is being backwashed is not shut off but flows with the backwash water from the filter to waste. Backwashing of the filter continues until the level of water in the storage compartment drops to the end of the vent pipe 57, thereby allowing air to enter this pipe as indicated in FIG. 7. This causes air to enter the upper end of the float chamber so that the level in the float chamber 39, tail pipe 33 and pipe 59 drop until the float actuated valve member 37 drops to its seat, thereby stopping the backwash flow. Filtered water now flows into and rises in the storage compartment 17, as indicated with reference to FIG. 4 and the cycle of operation is repeated.

*Summary of Advantageous Results*

By employing a float-actuated valve for both initiating and terminating the backwash operation automatically, I insure positive and reliable backwashing when the pressure loss across the filter bed reaches a predetermined high point. I thus provide mechanical means for positively and instantaneously establishing a fully operative subatmospheric pressure in the backwash conduit, thus eliminating the waste of water which would result from gradual exhaustion of air by purely hydraulic principles of operation. Quick and positive creation of the maximum vacuum in the backwash conduit is not possible with controls of the type that are dependent entirely upon hydraulically created suction. The reason for this is that the build-up of differential pressure across the filter bed is so gradual that the overflow into the waste outlet must continue for a considerable period of time before the vacuum can be lowered to the point where backwash flow through the filter bed can be initiated.

My invention secures further advantageous results in a multiple bed filter having a backwash water reservoir extending above and common to all of the filter chambers of the unit. In such units the backwash rate of flow can be maintained at a higher level and at a more constant rate throughout the backwashing. Thus by employing float operated valve controls for the several filter chambers of a multiple filter bed unit having a single backwash storage compartment for all of the filter bed, I am enabled to provide large storage capacity for backwash water in a shallow tank section wherein all of the water is at a higher elevation and at a relatively shallow depth. The ultimate result is a more thorough and efficient cleaning of the filter media combined with a minimum waste of water in each cycle of operation.

I claim:

1. A filter comprising, a filter chamber containing a filter bed, a backwash water storage compartment extending above said chamber, an underdrain compartment extending below said filter chamber and in continuous communication with said storage compartment, a filtered water outlet connected to said underdrain compartment, a water inlet connected to the top of said filter chamber, a backwash conduit having an inlet end connected to the upper portion of said filter chamber and an outlet end disposed at an elevation below said underdrain compartment, a waste outlet disposed to receive liquid from the outlet end of said backwash conduit, a backwash control valve interposed in said backwash conduit, a vertically elongated float chamber extending upwardly from said valve to an elevation substantially above the top of said storage compartment, the lower end of said float chamber being in communication with said backwash conduit, and a float in said float chamber operatively connected to said valve and movable in response to changes in the level of liquid in said float chamber to actuate said valve to and from closed position, whereby backwash flow through said filter chamber is initiated by the opening of said valve when pressure loss across the filter bed causes a predetermined rise in the head of water in said float chamber, and means for terminating the backwash flow upon a drop of the liquid level in said storage compartment to a predetermined low level.

2. A filter in accordance with claim 1 wherein said means for terminating the backwash flow comprises a vent pipe communicating with the upper end of said float chamber and having an end communicating with the lower portion of said storage chamber and a lower end opening disposed at an elevation below said underdrain compartment, and a liquid seal closure for said lower end opening.

3. A filter in accordance with claim 1 in which said valve comprises a closure member, a seat for said member and lost motion linkage interposed between said closure member and float, including spring means for storing energy during the rise of liquid in the float chamber and for unseating the closure member when a predetermined high level is reached therein.

4. A filter in accordance with claim 1 in which said filtered water outlet includes a weir box and effluent weir disposed to limit the high level of liquid in said backwash water storage compartment to a predetermined operating level for the filter operation.

5. A filter in accordance with claim 1 in which said water inlet includes gravity feed means disposed to limit the hydrostatic pressure and rate of feed to the filter.

6. A multiple bed filter comprising, a tank containing a plurality of separate filter chambers, each containing a filter bed, a common underdrain compartment extending beneath the several filter chambers in said tank, a common backwash storage compartment extending above the several filter chambers in said tank, a conduit connecting said underdrain compartment with said storage compartment, a filtered water outlet connected to said underdrain compartment, water inlets severally connected to the top of the respective filter chambers, backwash conduits each having an inlet end connected to the upper portion of one of said filter chambers and an outlet end disposed at an elevation below said underdrain compartment, a backwash control valve interposed in said backwash conduit for each of said filter chambers, a vertically elongated float chamber extending upwardly from said valve to an elevation substantially above the top of said storage compartment for each filter chamber, the lower end of each float chamber being in communication with one of said backwash conduits, a float in each of said float chambers, and means operatively connecting each of said floats to one of said valves, said floats being movable in response to changes in the level of liquid in the several float chambers to actuate said valve to and from closed position.

7. A filter in accordance with claim 6 including a vent pipe communicating with the upper end of each of said float chambers and having an end communicating with the lower portion of said storage chamber, a lower end opening disposed at an elevation below said underdrain compartment, and a liquid seal closure for said lower end opening.

8. A filter in accordance with claim 6 in which each of the valves comprises a closure member, a seat for said closure member, said means operatively connecting each float to one of said valves comprising, a lost motion linkage interposed between said closure member and float, including spring means for storing energy during the rise of liquid in the float chamber and for unseating the closure member when the liquid reaches a predetermined high level in the float chamber.

9. A filter in accordance with claim 6 in which said filtered water outlet includes a weir box and an effluent weir disposed at an elevation corresponding to the predetermined high level of liquid required in said backwash storage compartment for the filter operation.

10. A filter in accordance with claim 6 in which said water inlet for each filter chamber includes gravity feed means disposed to limit the hydrostatic pressure and rate of feed of water to the several filter chambers in said tank.

11. A filter in accordance with claim 1 in which said vertically elongated float chamber extends above the upper level of liquid in said storage compartment at least to an elevation corresponding to the predetermined loss of pressure head across the filter bed required to open the float actuated valve.

12. A filter in accordance with claim 3 in which said float comprises a vertically elongated body, a tubular core extending through said body from bottom to top, rigidly connected thereto and containing said spring means, said linkage including a stem connected at its lower end to said closure member, an abutment for the upper end of said spring means fixed on said stem, and an abutment for the lower end of said spring means fixed in said tubular core.

References Cited in the file of this patent
UNITED STATES PATENTS

| | | |
|---|---|---|
| 358,677 | Kommerell et al. | Mar. 1, 1887 |
| 2,879,891 | Beohner et al. | Mar. 31, 1959 |